United States Patent [19]

Beeman

[11] 3,946,164
[45] Mar. 23, 1976

[54] PRECISE TONE SIGNAL GENERATOR
[75] Inventor: Robert H. Beeman, Berkeley, Ill.
[73] Assignee: GTE Automatic Electric Laboratories Incorporated, Northlake, Ill.
[22] Filed: May 28, 1974
[21] Appl. No.: 473,851

[52] U.S. Cl............................. 179/84 VF; 179/90 K
[51] Int. Cl.²........................................ H04M 19/02
[58] Field of Search .......... 179/90 K, 18 HB, 27 H, 179/84 VF, 16 EC, 18 EB, 18 AH; 331/51; 328/25, 39

[56] References Cited
UNITED STATES PATENTS

| | | |
|---|---|---|
| 3,581,020 | 5/1971 | Ribner............................. 179/18 HB |
| 3,719,897 | 3/1973 | Tarr..................................... 331/51 |
| 3,778,557 | 12/1973 | Frederiksen ..................... 179/90 K |
| 3,787,836 | 1/1974 | Hagelbarger...................... 179/90 K |
| 3,829,783 | 8/1974 | Groenendaal et al............. 179/90 K |

Primary Examiner—Kathleen H. Claffy
Assistant Examiner—Gerald L. Brigance
Attorney, Agent, or Firm—Robert J. Black

[57] ABSTRACT

A circuit for generating precise tone signals for use in telecommunications systems, such as dial tone, busy tone, ringback tone, etc. the circuit provides tone signals at a level suitable for application for distribution throughout a telephone central office. A facility for providing interrupt of the signals at either a 60 or 120 IPM rate is included.

10 Claims, 1 Drawing Figure

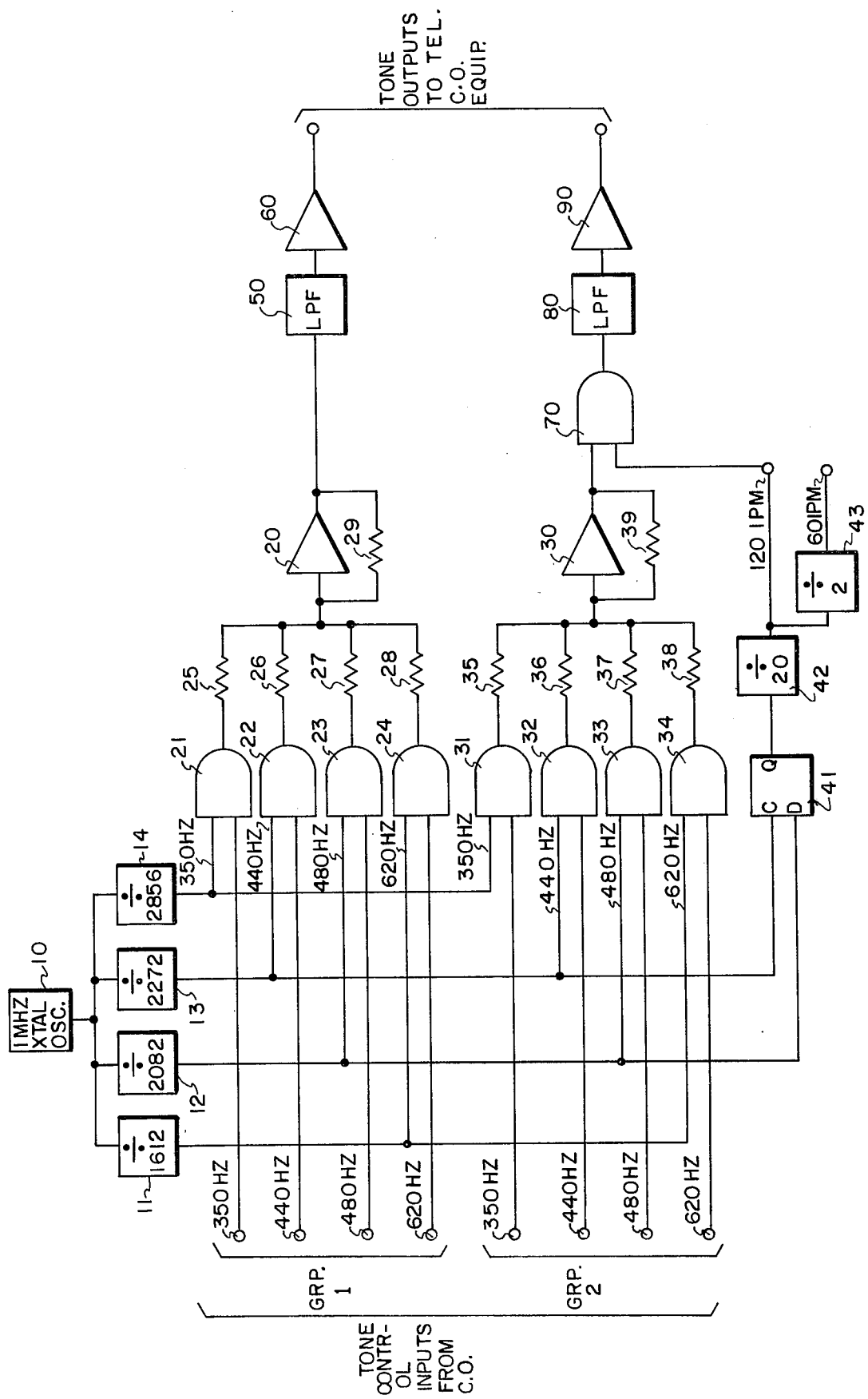

PRECISE TONE SIGNAL GENERATOR

BACKGROUND OF THE INVENTION

1. Field of the Invention

The present invention relates to telecommunication systems and particularly to circuitry for supplying precise tone signals in a telephone central office.

2. Description of the Prior Art

Since the requirement for use of precise tones in telephone central office equipment has existed, the circuitry most commonly used employs two L/C oscillators to produce two precise tone frequencies. These two tones are then mixed and fed to an output amplifier to drive the distribution paths for use throughout the telephone central office. A level adjustment permits the output level and therefore the final tone level at the main distributing frame to be established. Thus by controlling the level of the supply circuit the output is controlled.

A transfer circuit is frequently incorporated into the design so that each of two tone circuits, for any given signal, is fed to about half of the telephone central office load. Upon failure of one of the circuits, the portion of the load that is supplied, is transferred to the other circuit. Circuitry like that described is provided along with telephone central office equipment as manufactured by major telephone communication manufacturers such as GTE Automatic Electric and Western Electric.

The desired approach has several shortcomings. Because the oscillators are of the L/C type, they are known to drift in frequency, with time, temperature and voltage variations.

In the present invention the output of the frequency dividers selected, are summed and fed through a low pass filter to an output amplifier, which includes a certain amount of gain variable over a small range, to compensate for component variation and losses within the telephone central office. If required, failure detectors and transfer circuitry of various types well known in the telephone communications field may be included to operate in a manner similar to previous circuits. The present circuitry typically is used in conjunction with several different attenuator pads, all of which have a 900 OHM output impedance, but which may have different amounts of loss. Through the use of such pads, signals consisting of the same combination of tones but differing in amplitude may be generated by the same cards, rather than having to use a separate set of cards for each different amplitude of each tone combination.

By means of the present invention a universal circuit is provided so that upon installation into the telephone central office equipment the precise tone and correct signal combination will be provided as long as the card is properly strapped or programmed. With the present arrangement only one circuit card will be required for each frequency combination and external interruption will not be required. No frequency drift problem exists.

BRIEF DESCRIPTION OF THE DRAWING

The accompanying drawing is a combined logic block and schematic circuit diagram of a precise tone generator including interrupter circuitry, in accordance with the present invention.

DESCRIPTION OF THE PREFERRED EMBODIMENT

Referring now to the accompanying drawing, the included circuitry comprises a 1 MHZ crystal oscillator 10 whose output is connected to four frequency dividers 11, 12, 13 and 14. Divider 11, divides the 1 MHZ signal output of the crystal oscillator 10 by 1,612 to produce an output frequency of 620 HZ. Divider 12 divides the crystal oscillator output frequency by 2,082 providing an output of 480 HZ. Divider 13 divides by 2,272 to provide an output of 440 HZ. Divider 14 divides by 2,856 to produce an output frequency of 350 HZ.

The output signals from the four dividers are coupled to two different groups of tone selector circuits each of the four tones being coupled to a tone selector group consisting of gates 21 through 24 inclusive as well as being coupled to a second group of tone selector circuits including gates 31 through 34. It should be noted that even though two groups of tone selector circuits are shown in the preferred embodiment, it would be equally within the scope of the present invention to include but a single group of tone circuits or alternately more than the two shown.

The signal outputs connected to the AND gates that form the tone selectors are gated in combination through the AND gates with tone control inputs corresponding to the signals applied to each individual gate, from selection circuitry normally included as a portion of the telephone central office equipment. The means whereby these signals are applied does not form a portion of the present invention, it would only be required that an appropriate gating signal be provided to select a desired tone.

Also included in the circuitry of the present invention is a summing circuit for each group of tone selectors. One of these summing circuits includes resistors 25, 26, 27 and 28, amplifier 20 and feedback resistor 29 all associated with the tone selectors comprised of gates 21 through 24. For the second group of tone selectors consisting of gates 31 through 34, the summing circuitry consists of resistors 35 through 38 and amplifier 30 and feedback resistor 39.

The output of amplifier 20 which forms the output of one of the summing circuits described above is connected through a low pass filter 50 then reamplified by output amplifier 60 to provide a precise tone output generated by the present circuitry. The output of amplifier 30 which provides the output of the summing circuit associated with gates 31 through 34 is connected to AND gate 70. At AND gate 70 the other input comes from the interrupter circuitry which consists of a type D flip-flop 41 whose inputs are connected to the outputs of the frequency dividers 12 and 13 and whose output is connected to a frequency divider 42 which divides the output of flip-flop 41 by 20. The output of divider 42 provides an output of 120 impulses-per-minute. This same output may be further divided by a divider 43 which divides by two, to provide a 60 impulse-per-minute output. As shown in the accompanying drawing the 120 impulse-per-minute output has been strapped to the input of AND gate 70. Alternately the 60 IPM output could have been strapped to provide that interrupt rate. The output of gate 70 is then connected to a low pass filter 80 whose output is connected to amplifier 90 which will then amplify and extend to the telephone central office equipment the selected tone output at the 120 IPM interrupted rate.

The above circuitry has been generally shown in either symbolic or block form because the individual detailed circuitry does not form a portion of the present invention. Rather it is only required that each of the circuits operate to provide the functions described hereinafter. Many forms of conventional circuitry could be employed to function as described and fall within the scope of the present invention, such circuitry being well within the capabilities of those skilled in the art.

As noted above a preferred embodiment of the present invention provides circuitry for generating two different tone combinations. There is included however only one interruption generator and only one summing circuit capable of being interrupted on the card because in telephone central office requirements relatively few of the tone signals have a requirement to be supplied on an interrupted basis.

As may be obvious in referring again to the accompanying drawing, the 1 MHZ crystal oscillator 10 generates signals at its output frequency on a constant basis and provides these tone signals to the divider circuits 11, 12, 13 and 14 which continually supply signals at their respective output frequencies to the tone selector gates 21 through 24 and 31 through 34. The tones then desired for use are selected by telephone central office circuitry external to the present tone generators over the input leads designated 350, 440, 480, 620 HZ etc., associated with Group One if there is no desire that the tone be interrupted.

For example if the selection equipment requests that the tone to be provided to the central office equipment, be dial tone. Inputs will be placed on the 350 HZ input terminal and the 440 HZ input terminal causing operation of gates 21 and 22 respectively whose outputs will then be summed through the summing circuitry via resistors 25 and 26 and amplifier 20 where they will be extended through low pass filter 50 which will remove the harmonic content and change the square-waves generated, into sine-waves. These summed sine-waves will then be amplified by output amplifier 60 and applied to the telephone central office circuitry as required.

If the selection circuitry wanted a reorder tone to be applied to the telephone central office equipment, input signals on the tone control inputs for 480 HZ and 620 HZ in Group Two would be applied causing operation of gates 33 and 34 permitting the associated tone signals of 480 HZ and 620 HZ to be extended to the summing circuitry through resistors 37 and 38 with the resultant signal available at the output of amplifier 30. The combined tone is then applied to the input of AND gate 70 to be gated by the interrupt circuitry.

As noted previously the interrupt circuitry consists of a D type flip-flop 41 whose inputs C and D are connected to the 440 HZ and 480 HZ signal leads. The operation of the flip-flop in response to this combination of inputs would produce on the Q output a "true" condition at the rate of 40 pulses-per-second or 2,400 pulses-per-minute. This output signal is then applied to frequency divider 42 which divides by 20 producing an output of two pulses-per-second or 120 impulses-per-minute. As shown in the accompanying drawing this 120 impulse-per-minute output is also strapped to AND gate 70 which therefore provides the summed output of the 480 HZ and 620 HZ signals (at a rate of 120 times-per-minute) to the low pass filter 80. Low pass filter 80 and amplifier 90 operate in the manner described above in connection with the description of low pass filter 50 and amplifier 60, to provide the desired reorder tone to the telephone central office equipment.

It should be noted at this time that if it had been desired to interrupt the output signal at the rate of 60 impulses-per-minute, the output from frequency divider 42 would have been divided again by 2, by divider 43, to produce a 1 pulse-per-second output or 60 impulse-per-minute. This output would then have been coupled to gate 70 to provide appropriate interruption.

While but a single embodiment of the present invention has been disclosed it will be obvious to those skilled in the art the numerous modifications may be made without departing from the spirit of the present invention which is limited only by the scope of the claims appended hereto.

I claim:

1. Tone signal generating means operable to generate selected tone signals for use in an associated telecommunication system comprising: an oscillator circuit operated to generate signals at a first frequency; a plurality of different frequency divider circuits each connected to said oscillator circuit and each operated in response to said oscillator circuit output signals to generate different output signals at frequencies different than that of said oscillator circuit; at least one summing circuit; a plurality of tone selector circuits each including a first input connected to a different one of said frequency divider circuits, a second input connected to selection circuitry of said telecommunications system and an output connected to said summing circuit, selectively operated in response to a signal from said telecommunication system selection circuitry to couple said selected connected frequency divider circuit output signals to said summing circuit; first filter means connected between said summing circuit and the output of said tone signal generating means; said summing circuit operated in response to one or more selected frequency divider circuit output signals coupled from said tone selector circuits to couple the sum of said signals to said filter means; said filter means operated to condition said sum signal and couple said conditioned signal to said telecommunications system.

2. Tone signal generating means as claimed in claim 1 wherein: there is further included interrupter means connected to a plurality of said frequency divider circuits, operated in response to output signals from said connected frequency divider circuits to generate periodic signals for interruption of said sum signals; and gating means connected between said summing circuit and said filter means operated in response to said interruption signals to periodically interrupt the coupling of signals from said summing means to said low pass filter at a predetermined rate.

3. Tone signal generating means as claimed in claim 2 wherein: said interrupter means comprise a flip-flop circuit with inputs connected to said plurality of frequency divider circuits, operated in response to output signals from said connected frequency divider circuits to periodically generate an output pulse at a frequency less than that of any of said frequency divider circuit tone signals; and frequency divider means connected to said flip-flop circuit output and operated in response to said flip-flop circuit to generate a periodic signal for interruption of said summed signals.

4. Tone signal generating means as claimed in claim 1 wherein: said oscillator circuit is crystal controlled.

5. Tone signal generating means as claimed in claim 1 wherein: said plurality of tone selector circuits each comprise an AND gate.

6. Tone signal generating means as claimed in claim 1 wherein: said summing circuit comprises a linear amplifier, and a plurality of resistors each connected to a different one of said tone selector circuits and each connected to the input of said linear amplifier.

7. Tone signal generating means as claimed in claim 1 wherein: said filter means comprise a low pass filter.

8. Tone signal generating means as claimed in claim 1 wherein: there is further included amplifying means connected between said filter means and said tone signal generating means output operated to amplify said conditioned signals and couple said amplified conditioned signals to said tone signal generating means output.

9. Tone signal generating means as claimed in claim 2 wherein: said gating means comprise an AND gate.

10. Tone signal generating means as claimed in claim 1 wherein: there is further included; a second summing circuit; a second plurality of tone selector circuits each including a first input connected to a different one of said frequency divider circuits, a second input connected to said telecommunication system selection circuitry and an output connected to said second summing circuit, selectively operated in response to a signal from said telecommunication system selection circuitry to couple said selected connected frequency divider circuit output signals to said second summing circuit; second filter means connected to said tone signal generating means output; gating means connected between said second summing circuit and said second filter means; and interrupter means connected between a plurality of said frequency divider circuits and said gating means operated in response to output signals from said connected frequency divider circuits to periodically generate an output pulse at a frequency less than that of any of said frequency divider circuit output signals connected to said interrupter means; said gating means operated in response to said periodic signals to periodically interrupt the coupling of signals from said second summing means to said second filter means; said second filter means operated to condition said interrupted sum signals for use in said telecommunication systems and couple said periodically interrupted conditioned signals to said tone signal generating means output.

* * * * *